2,900,356
Patented Aug. 18, 1959

2,900,356

SOLUTION COMPRISING ZINC AROMATIC POLYESTER, METHOD OF MAKING, AND WIRE COATED THEREWITH

Rudolph Paul Arndt, Muskegon, Mich., assignor to Anaconda Wire and Cable Company, a corporation of Delaware No Drawing. Application October 9, 1956
Serial No. 614,819

15 Claims. (Cl. 260—33.4)

This invention relates to an improved wire coating composition for the manufacture of insulated magnet wire. More particularly, the invention is directed to an improved wire coating composition comprising a zinc polyester dissolved in an inert solvent and to a method of preparing such solution. The invention further contemplates the provision of an improved magnet wire made by applying a thin film of the new coating composition to a metallic conductor.

The recent commercial availability of a large number of dicarboxylic acids has stimulated renewed interest in polyesters suitable for use in insulating compositions. Certain of the aromatic homopolyesters, such as polyethylene terephthalate, have been found to possess excellent physical, mechanical and electrical properties. Such aromatic homopolyesters, however, exhibit a high degree of molecular orientation and crystallinity, and consequently are characterized by a low solubility in an organic solvent and a marked inability to wet or adhere to a metallic surface even when dissolved in an organic solvent. Since the usual procedure for insulating magnet wire is based on initially coating a metallic conductor by immersion in solution (enamel) containing the insulating material, the low solubility of the highly-oriented aromatic homopolyesters renders them unsatisfactory for use in wire coating compositions based on dipping enamels.

When the structure of an aromatic polyester is modified, as by inclusion of either a saturated aliphatic dicarboxylic acid or a polyhydroxy alcohol containing more than two hydroxy groups into the polyester molecule, the degree of molecular orientation is diminished, resulting in significant changes in the polyester properties. Although the modified aromatic co-polyesters have been found to possess a higher affinity for organic solvents as well as increased wetting characteristics, this decrease in the degree of molecular orientation is accompanied by a depressed melting point and a lower thermal stability. Many such aromatic co-polyesters have been successfully used as insulation of magnet wire, but if the magnet wire is intended to function in motors or coils operating at high temperatures, then the aromatic co-polyesters are often inadequate.

Using polyesters and co-polyesters modified by the inclusion of zinc into the polyester structure, I have found that wire coating compositions composed essentially of these zinc polyesters, dissolved in an inert organic solvent, not only exhibit excellent wetting properties for metallic surfaces, but form insulating films which have an improved thermal stability. Preparation of the zinc polyester may readily be accomplished by reacting a zinc salt of an organic acid together with a polyester containing a terminal carbalkoxy group. Depending upon the dicarboxylic diester and polyhydroxy alcohol used to form the initial polyester containing a terminal carbalkoxy group, the properties of the zinc polyester may be varied over a wide range. The preferred polyester compositions for preparing the wire coating compositions in accordance with this invention, however, contain an aromatic dicarboxylic acid in the polymer structure. Accordingly, the wire coating composition of this invention comprises a solution in an inert solvent of a zinc polyester reaction product of (a) a zinc salt of an organic acid and (b) a solution in an inert solvent of a substantially equivalent quantity of an aromatic dicarboxylic diester together with at least one aliphatic polyhydroxy alcohol, said polyester reaction product containing from about 5 to about 50 percent by equivalent weight of the original equivalent weight of carbalkoxy groups.

A solution of the zinc polyester in a suitable solvent may be obtained directly by reacting the zinc salt of the organic acid and the initial polyester reaction product in the desired solvent medium, so that the resultant zinc polyester solution requires no further processing before use as a wire coating lacquer. Alternatively, the coating composition may be prepared by dissolving the zinc polyester in a suitable solvent medium. Although a very viscous zinc polyester enamel solution is prepared by increasing the zinc polyester concentration, I have found that desirable insulating films are formed from zinc polyester coating compositions having a viscosity in the range from 5 to 400 poises at room temperature. Exceptionally smooth films are formed, however, from the enamels having a viscosity range from 25 to 150 poises at 25° C., as measured by a Brookfield viscometer.

The coating compositions prepared in accordance with this invention can be applied to a metallic conductor by a conventional wire coating machine, using dies of various diameters to control the wet-film thickness. After the wire has been coated with the polyester solution, it is passed through an oven to remove the solvent. This heat treatment results in a further polymerization of the zinc polyester to a smooth, abrasion resistant, thermally stable film, which exhibits excellent adhesion and bonding to the surface of the metallic conductor. The baking temperature required for removal of the solvent and further polymerization of the zinc polyester generally varies from about 200° to 450° C. The finished wire thus comprises a metallic conductor coated with a thin substantially uniform and continuous insulating film of the zinc polyester.

Preparation of the initial polyester reaction product containing a terminal carbalkoxy group, from which the zinc polyester is subsequently produced, is effected by reacting an aromatic dicarboxylic diester together with at least one aliphatic polyhydroxy alcohol, preferably in the presence of a polyesterification catalyst, such as litharge and sodium acetate. The reaction is controlled in such manner that the polyester reaction product contains from 5 to 50 percent by equivalent weight of the original equivalent weight of carbalkoxy groups present in the aromatic dicarboxylic diester. Although precise control of the degree of polymerization of the polyester is difficult, an approximation of the molecular weight range of the initial polyester reaction product may be made from the quantity of alcohol displaced from the carbalkoxy groups as a result of the polyesterification reaction.

Many aromatic dicarboxylic diesters have been found to be suitable for the preparation of the initial polyester reaction product, and exert a pronounced influence on the ultimate properties of the zinc polyester being formed. Those aromatic dicarboxylic diesters which are especially significant include diethyl p,p'-sulfonyldibenzoate, dibutyl p,p'-sulfonyldibenzoate, di-n-propyl m,p'-sulfonyldibenzoate, di-n-hexyl m,m'-sulfonyldibenzoate, dimethyl terephthalate, di-n-hexyl terephthalate, dimethyl isophthalate, p,p'-dicarboxymethyl benzophenone, 1,2-bis (p-carbopropoxyphenoxy) ethane, and p,p'-dicarboxymethyl diphenyl.

The aromatic dicarboxylic diester provides rigidity to the initial polyester structure, and hence the properties of the structure may be modified by using various polyhydroxy alcohols to give the polyester reaction product either a linear or a cross-linked structure. A highly linear initial polyester reaction product is formed when a straight-chain polymethylene glycol, such as ethylene glycol, is used in the polyesterification, while a branched, or cross-linked, product results when a trihydroxy alcohol, such as glycerol, is employed. I have found it particularly advantageous, however, to prepare the zinc polyester from a co-polyalkylene carboxylate, which contains a mixture of polyhydroxy alcohols, such as glycerol and ethylene glycol.

As a general rule, the particular polyhydroxy alcohol, suitable for the preparation of the initial polyester reaction product, is limited solely by availability. Many polyhydroxy alcohols have been found satisfactory, including the glycols, such as ethylene glycol, 1,3-propanediol, 1,4-butanediol, and 1,6-hexanediol, and those polyhydroxy alcohols containing more than two hydroxy groups, such as glycerol, sorbitol, mannitol, pentaerythritol, dipentaerythritol, methylglycerol, and 1,2,4-butanetriol.

A further modification in the properties of the initial polyester reaction product may be obtained by replacing a portion of the aromatic dicarboxylic diester with an ester of an aliphatic dicarboxylic acid, thereby conferring a somewhat amorphous character to the resultant polyester reaction product. In such cases, I have found it advantageous to choose the replacement acid from the diesters of such acids as oxalic acid, adipic acid, succinic acid, sebacic and isosebacic aids, 2,2'-dimethylglutaric acid, maleic acid, fumaric acid, dimethylmalonic acid and similar compounds. Generally, however, it is advisable to limit the molecular proportion of the replacement acid to not more than about one-third of the amount of dicarboxylic acid present in the polyester.

As indicated previously, the amount of alcohol displaced and removed during the polyesterification reaction serves as an indication of the relative amount of carbalkoxy groups remaining in the initial polyester reaction product. After about 50 to 95 percent of the alcohol is removed, the polyester is fairly viscous, and is preferably dissolved in an inert solvent, such as cresylic acid or naphtha, to facilitate agitation of the mixture. However, the solvent may be dispensed with if a highly viscous reaction product is desired. Upon the addition of a substantially equivalent quantity of a zinc salt of an organic acid to the polyester solution, a low-boiling product distills off, leaving the zinc polyester.

Although no knowledge is available as to the exact mechanism of the reaction which occurs between the zinc salt and the terminal carbalkoxy groups, it appears that the carboxylate from the zinc salt combines, in some manner, with the alcohol of the terminal carbalkoxy groups, forming an ester which distills from the reaction mixture and leaving the zinc polyester. To illustrate this reaction, when zinc acetate is reacted with a copolyalkylene terephthalate, which was prepared by polyesterification of dimethyl terephthalate together with glycerol and ethylene glycol so that approximately 10 percent of the original carbomethoxy groups are present, methyl acetate rapidly distills from the reaction mixture, leaving a zinc co-polyalkylene terephthalate. Subsequent heating of this zinc co-polyalkylene terephthalate results in the formation of extremely tough but smooth and flexible films.

Although many zinc salts have been found to yield suitable zinc polyesters, I have found that the zinc salts of the lower organic acids, such as zinc acetate, zinc formate, zinc propionate, zinc butyrate, and zinc valerate, tend to react more readily with the polyester reaction product. In addition, the alkyl ester formed, when these zinc salts are employed, may be displaced from the reaction mixture by distillation, thereby favoring the formation of the zinc polyester. The zinc polyesters prepared from zinc acetate, in particular, have been found to form smooth, thermally-stable, and abrasion resistant insulating films. However, lacquers and enamels of zinc polyesters prepared from other zinc salts also yield excellent insulating films. Such zinc salts as zinc benzoate, zinc citrate, zinc naphthenate, zinc salicylate, zinc tartrate, and zinc octoate, are among other suitable reactants.

The unusual wetting properties that a solution of the zinc polyester exhibits towards metallic surfaces enables the coating composition of the invention to be applied to a bare metallic conductor merely by passing the wire through a bath of the lacquer. After baking the wet-coated wire in an oven to remove the carrier solvent, the resultant zinc polyester film is uniformly distributed about the periphery of the wire, and is resistant both to thermal shock and thermal degradation.

The following examples are illustrative of the wire coating compositions prepared in accordance with this invention:

Example I

A mixture of 1280 g. of dimethyl terephthalate, 245 g. of glycerol and 228 g. of ethylene glycol was melted in a resin reactor equipped with a stirrer and a packed distillation column bearing a water-cooled condenser. As soon as the temperature of the molten mixture had risen to about 135° C., 0.25 g. of litharge and 0.12 g. of sodium acetate were added to catalyze the interestification reaction. The reaction mixture was heated, with stirring, for about two hours, during which time the temperature slowly rose to about 280–300° C., and methanol was continuously removed by distillation through the packed column.

After about 90 percent of the methanol had been removed, the liquid polyester was dissolved in a solvent pair consisting of 1240 g. of cresylic acid and 620 g. of high-boiling naphtha containing 99.5 percent by weight of aromatics, B.P. 153° C. to 173° C. (ASTM D–268), marketed by the Esso Standard Oil Company under the trade name of "Solvesso 100." The resultant solution was heated to about 160° C. and 80 g. of zinc acetate added, with stirring, until all of the zinc acetate had dissolved. As the zinc acetate dissolved in the polyester enamel, methyl acetate was continuously removed through the packed column by distillation, leaving the zinc polyester composition in the resin reactor.

Using a conventional wire coating machine to limit the wet film thickness, the coating composition thus prepared was applied to a bare copper wire, which was subsequently baked at a temperature of about 450° C. The baked enamel film was uniform in thickness about the periphery of the wire and exceptionally smooth. Even upon the application of second and third coatings of the zinc polyester to the wire, the films were smooth and completely free from pinholes, illustrating the remarkable wetting properties the zinc polyester possesses for metallic surfaces. The smoothness of the coating composition is appreciably increased by the addition of small quantities of liquid silicone resins.

Example II

An increased molecular proportion of zinc contained in the zinc polyester composition is realized by melting a mixture of 640 g. of dimethyl terephthalate, 120 g. of glycerol and 114 g. of ethylene glycol in a reaction vessel as described in Example I, and then adding the interesterification catalysts when the temperature approaches about 130° C. After heating the reaction mixture to about 200–250° C., and removing only about 50 per cent of methanol through the packed column, approximately 600 g. of cresylic acid is added, together with 200 g. of zinc acetate, and the mixture heated until substantially all of the methyl acetate is removed by distillation through the packed column. If the mixture becomes too viscous, additional cresylic acid or naphtha may be added to retain the zinc polyester in solution.

Example III

A zinc polyester coating composition similar to that of Example I is prepared by the procedure of Example I, except that an equivalent quantity of zinc octoate is added to the polyester enamel, and methyl octoate was removed from the reaction mixture. After applying the composition to a bare copper conductor, and baking at a temperature of about 200–450° C., a hard, thermally-stable film is formed on the wire.

Similarly, when the coating composition is prepared by adding zinc naphthenates, the ester removed is methyl naphthenate, and the remaining zinc polyester forms hard, smooth enamels upon heating.

Example IV

A zinc polyester coating composition is prepared by melting a mixture of 1590 g. of diethyl p,p'-sulfonyldibenzoate, 438 g. of 1,6-hexanediol, and 245 g. of glycerol in a reaction vessel equipped with a stirrer and a packed distillation column bearing a water-cooled condenser, and adding 2 g. of sodium hydride to catalyze the polyesterification reaction. After the addition of the polyesterification catalyst, the reaction mixture is heated to about 250°–280° C., with stirring, until about 90 percent of the ethanol is displaced from the reaction mixture through the packed column by distillation.

After diluting the viscous polyester with a solvent pair consisting of cresylic acid-naphtha (2:1), the temperature is brought to about 180° C., and 80 g. of zinc acetate added, with stirring, until all of the zinc acetate dissolves.

During the addition of the zinc acetate and subsequent heating of the reaction mixture, ethyl acetate is continuously removed through the packed column by distillation, leaving the zinc polyester dissolved in the solvent pair in the reaction vessel. Removal of the carrier solvent after applying the resulting composition to a wire results in formation of an extremely hard but thermally-stable insulating film on the wire.

I claim:

1. Magnet wire comprising a metallic conductor coated with a thin substantially uniform and continuous insulating film comprising a zinc polyester reaction product of (a) a zinc salt of an organic carboxylic acid containing not more than about ten carbon atoms, and (b) a substantially stoichiometric equivalent quantity of a polyester reaction product of an aromatic dicarboxylic diester and at least one aliphatic polyhydroxy alcohol containing not more than about ten carbon atoms, said polyester reaction product containing from about 5 to about 50 percent by equivalent weight of the orignal equivalent weight of carbalkoxy groups.

2. Magnet wire comprising a metallic conductor coated with a thin substantially uniform and continuous insulating film comprising a zinc polyalkylene terephthalate reaction product of (a) a zinc salt of an organic carboxylic acid containing not more than about ten carbon atoms, and (b) a substantially stoichiometric equivalent quantity of a polyalkylene terephthalate reaction product of a dialkyl terephthalate in which the alkyl substituent contains not more than about six carbon atoms and at least one aliphatic polyhydroxy alcohol containing not more than about ten carbon atoms, said polyalkylene terephthalate reaction product containing from about 5 to about 50 percent by equivalent weight of the original equivalent weight of carbalkoxy groups.

3. Magnet wire comprising a metallic conductor coated with a thin substantially uniform and continuous insulating film comprising a zinc co-polyalkylene terephthalate reaction product of (a) a zinc salt of an organic carboxylic acid containing not more than about ten carbon atoms, and (b) a substantially stoichiometric equivalent quantity of a co-polyalkylene terephthalate reaction product of a dialkyl terephthalate in which the alkyl substituent contains not more than about six carbon atoms and a substantially equivalent quantity of a mixture of glycerol and ethylene glycol, said co-polyalkylene terephthalate reaction product containing from about 5 to about 25 percent by equivalent weight of the original equivalent weight of carbalkoxy groups.

4. Magnet wire comprising a metallic conductor coated with a thin substantially uniform and continuous insulating film comprising a zinc co-polyalkylene terephthalate reaction product of (a) zinc acetate and (b) a substantially stoichiometric equivalent quantity of a co-polyalkylene terephthalate reaction product of dimethyl terephthalate and a substantially equivalent quantity of a mixture of glycerol and ethylene glycol, said co-polyalkylene terephthalate reaction product containing about 10 percent by equivalent weight of the original equivalent weight of carbomethoxy groups.

5. Magnet wire comprising a metallic conductor coated with a thin substantially uniform and continuous insulating film comprising a zinc co-polyester reaction product of (a) a zinc salt of an organic carboxylic acid containing not more than about ten carbon atoms, and (b) a substantially equivalent quantity of a polyester reaction product of an aromatic dicarboxylic diester and an aliphatic dicarboxylic diester and at least one aliphatic polyhydroxy alcohol containing not more than about ten carbon atoms, said polyester reaction product containing from about 5 to about 50 percent by equivalent weight of the original equivalent weight of carbalkoxy groups.

6. A wire coating composition comprising a zinc polyester reaction product of (a) a zinc salt of an organic carboxylic acid containing not more than about ten carbon atoms, and (b) a substantially stoichiometric equivalent quantity of a polyester reaction product of an aromatic dicarboxylic diester and at least one aliphatic polyhydroxy alcohol containing not more than about ten carbon atoms, said polyester reaction product containing from about 5 to about 50 percent by equivalent weight of the original equivalent weight of carbalkoxy groups.

7. A wire coating composition comprising a zinc polyester reaction product of (a) a zinc salt of an organic carboxylic acid containing not more than about ten carbon atoms, and (b) a solution in an inert solvent of a substantially stoichiometric equivalent quantity of a polyester reaction product of an aromatic dicarboxylic diester and at least one aliphatic polyhydroxy alcohol containing not more than about ten carbon atoms, said polyester reaction product containing from 5 to about 50 percent by equivalent weight of the original equivalent weight of carbalkoxy groups.

8. A wire coating composition comprising a zinc polyalkylene terephthalate reaction product of (a) a zinc salt of an organic carboxylic acid containing not more than about ten carbon atoms, and (b) a substantially stoichiometric equivalent quantity of a polyalkylene terephthalate reaction product of a dialkyl terephthalate in which the alkyl substituent contains not more than about six carbon atoms and at least one aliphatic polyhydroxy alcohol containing not more than about ten carbon atoms, said polyalkylene terephthalate reaction product containing from about 5 to about 50 percent by equivalent weight of the original equivalent weight of carbalkoxy groups.

9. A wire coating composition comprising a zinc co-polyalkylene terephthalate reaction product of (a) a zinc salt of an organic carboxylic acid containing not more than about ten carbon atoms, and (b) a substantially stoichiometric equivalent quantity of a co-polyalkylene terephthalate reaction product of a dialkyl terephthalate in which the alkyl substituent contains not more than about six carbon atoms and a substantially equivalent quantity of a mixture of glycerol and ethylene glycol, said co-polyalkylene terephthalate reaction product containing from about 5 to about 25 percent by equivalent weight of the original equivalent weight of carbalkoxy groups.

10. A wire coating composition comprising a solution in a solvent mixture of cresylic acid-naphtha of a zinc copolyalkylene terephthalate reaction product of (a) zinc acetate and (b) a substantially stoichiometric equivalent quantity of a co-polyalkylene terephthalate reaction product of dimethyl terephthalate and a substantially equivalent quantity of a mixture of glycerol and ethylene glycol, said co-polyalkylene terephthalate reaction product containing about 10 percent by equivalent weight of the original equivalent weight of carbomethoxy groups, and said composition having a viscosity in the range from 25 to 150 poises at 25° C.

11. A wire coating composition according to claim 10, containing, in addition to the zinc co-polyalkylene terephthalate reaction product, a small quantity of liquid silicon resin.

12. The method of preparing a zinc polyester reaction product which comprises reacting an aromatic dicarboxylic diester and at least one aliphatic polyhydroxy alcohol containing not more than about ten carbon atoms to form a polyester reaction product containing from about 5 to about 50 percent by equivalent weight of the original equivalent weight of carbalkoxy groups, dissolving the polyester reaction product in an inert solvent, and reacting the resultant solution of the polyester reaction product with a substantially stoichiometric equivalent quantity of a zinc salt of an organic carboxylic acid containing not more than about ten carbon atoms, to form the zinc polyester reaction product dissolved in an inert solvent.

13. The method of preparing a zinc polyalkylene terephthalate reaction product which comprises reacting a dialkyl terephthalate in which the alkyl substituent contains not more than about six carbon atoms and at least one aliphatic polyhydroxy alcohol containing not more than about ten carbon atoms to form a polyalkylene terephthalate reaction product containing from about 5 to about 50 percent by equivalent weight of the original equivalent weight of carbalkoxy groups, dissolving the polyalkylene terephthalate reaction product in an inert solvent, and reacting the resultant solution of the polyester with a substantially stoichiometric equivalent quantity of a zinc salt of an organic carboxylic acid containing not more than about ten carbon atoms, to form the zinc polyalkylene terephthalate reaction product dissolved in an inert solvent.

14. The method of preparing a zinc co-polyalkylene terephthalate reaction product which comprises reacting a dialkyl terephthalate in which the alkyl substituent contains not more than about six carbon atoms and a substantially equivalent quantity of a mixture of glycerol and ethylene glycol to form a copolyalkylene terephthalate reaction product containing from about 5 to about 25 percent by equivalent weight of the original equivalent weight of carbalkoxy groups, dissolving the co-polyalkylene terephthalate reaction product in an inert solvent, and reacting the resultant solution of the co-polyester with a substantially stoichiometric equivalent quantity of a zinc salt of an organic carboxylic acid containing not more than about ten carbon atoms, to form the zinc co-polyalkylene terephthalate reaction product dissolved in an inert solvent.

15. The method of preparing a solution in a mixed cresylic acid-naphtha solvent of a zinc co-polyalkylene terephthalate reaction product which comprises reacting dimethyl terephthalate and a substantially equivalent quantity of a mixture of glycerol and ethylene glycol to form a co-polyalkylene terephthalate reaction product containing about 10 percent by equivalent weight of the original equivalent weight of carbomethoxy groups, dissolving the co-polyalkylene terephthalate reaction product in a solvent mixture of cresylic acid and naphtha, and reacting the resultant solution of the co-polyester with a substantially stoichiometric equivalent quantity of zinc acetate to form the zinc co-polyalkylene terephthalate dissolved in a cresylic acid-naphtha solvent.

References Cited in the file of this patent

UNITED STATES PATENTS 2,681,360    Vodonik _____ June 15, 1954

FOREIGN PATENTS 629,787    Great Britain _____ Sept. 28, 1949